(12) United States Patent
Shen et al.

(10) Patent No.: US 10,212,713 B2
(45) Date of Patent: Feb. 19, 2019

(54) RADIO COMMUNICATION SYSTEM, COMMON RECEPTION APPARATUS AND USER TERMINAL

(71) Applicant: NTT DOCOMO, INC., Tokyo (JP)

(72) Inventors: Jiyun Shen, Tokyo (JP); Satoshi Suyama, Tokyo (JP); Takahiro Asai, Tokyo (JP); Yukihiko Okumura, Tokyo (JP); Hidekazu Murata, Kyoto (JP)

(73) Assignee: NTT DOCOMO, INC., Tokyo (JP)

( * ) Notice: Subject to any disclaimer, the term of this patent is extended or adjusted under 35 U.S.C. 154(b) by 107 days.

(21) Appl. No.: 15/108,010

(22) PCT Filed: Dec. 26, 2014

(86) PCT No.: PCT/JP2014/084481
§ 371 (c)(1),
(2) Date: Jun. 24, 2016

(87) PCT Pub. No.: WO2015/099113
PCT Pub. Date: Jul. 2, 2015

(65) Prior Publication Data
US 2016/0323894 A1 Nov. 3, 2016

(30) Foreign Application Priority Data
Dec. 27, 2013 (JP) .................................. 2013-271080

(51) Int. Cl.
*H04W 72/08* (2009.01)
*H04L 5/00* (2006.01)
(Continued)

(52) U.S. Cl.
CPC ............ *H04W 72/082* (2013.01); *H04B 7/04* (2013.01); *H04B 7/0452* (2013.01);
(Continued)

(58) Field of Classification Search
None
See application file for complete search history.

(56) References Cited

U.S. PATENT DOCUMENTS

| 8,159,954 B2 | 4/2012 | Larsson et al. |
| 8,400,904 B2 | 3/2013 | Lim et al. |

(Continued)

FOREIGN PATENT DOCUMENTS

| JP | 2007-228509 A | 9/2007 |
| JP | 2008-118337 A | 5/2008 |

(Continued)

OTHER PUBLICATIONS

Extended European Search Report issued in the counterpart European Patent Application No. 14873525.1, dated Jun. 30, 2017 (8 pages).

(Continued)

*Primary Examiner* — Candal Elpenord
(74) *Attorney, Agent, or Firm* — Osha Liang LLP

(57) ABSTRACT

To suppress reduction in system performance for mobile communications (group mobility) in a plurality of terminals existing inside the same moving object, a radio communication system for a plurality of user terminals existing inside a moving object and a radio base station is described. The user terminal receives a signal transmitted from the radio base station, and transmits the signal transmitted from the radio base station to a common reception apparatus disposed inside the moving object. The common reception apparatus detects a signal for each user terminal, based on signals transmitted from the plurality of user terminals, and transmits the detected signal to each user terminal. The user terminal receives the signal for the user terminal detected in the common reception apparatus to demodulate. Thus, for group mobility, it is possible to cancel interference among (Continued)

user terminals to improve the multiplexing effect, while suppressing communication overhead.

7 Claims, 10 Drawing Sheets

(51) Int. Cl.
| | | |
|---|---|---|
| *H04B 7/04* | (2017.01) | |
| *H04B 7/0452* | (2017.01) | |
| *H04B 7/0456* | (2017.01) | |
| *H04B 7/06* | (2006.01) | |
| *H04W 84/00* | (2009.01) | |
| *H04W 16/28* | (2009.01) | |
| *H04L 1/00* | (2006.01) | |

(52) U.S. Cl.
CPC ......... *H04B 7/0456* (2013.01); *H04B 7/0617* (2013.01); *H04B 7/0619* (2013.01); *H04L 5/006* (2013.01); *H04L 5/0026* (2013.01); *H04W 84/005* (2013.01); *H04L 1/0026* (2013.01); *H04W 16/28* (2013.01)

(56) References Cited

U.S. PATENT DOCUMENTS

| | | | |
|---|---|---|---|
| 8,416,729 B2 | 4/2013 | Lo et al. | |
| 8,937,899 B2 | 1/2015 | Silva et al. | |
| 9,083,421 B2 | 7/2015 | Coldrey et al. | |
| 9,312,946 B2 | 4/2016 | Van Phan et al. | |
| 2002/0122403 A1* | 9/2002 | Hashem | H04W 40/02 |
| | | | 370/342 |
| 2010/0297937 A1* | 11/2010 | Kim | H04B 7/1555 |
| | | | 455/11.1 |
| 2012/0281778 A1* | 11/2012 | Ruan | H04B 7/0456 |
| | | | 375/267 |
| 2012/0294224 A1 | 11/2012 | Silva et al. | |
| 2013/0170409 A1* | 7/2013 | Ihm | H04B 7/2621 |
| | | | 370/294 |
| 2014/0198715 A1* | 7/2014 | Zasowski | H04W 16/26 |
| | | | 370/315 |
| 2014/0204832 A1 | 7/2014 | Van Phan et al. | |
| 2015/0181502 A1* | 6/2015 | Hans | H04W 40/22 |
| | | | 455/437 |

FOREIGN PATENT DOCUMENTS

| | | |
|---|---|---|
| JP | 2008-533806 A | 8/2008 |
| JP | 2010-050854 A | 3/2010 |
| JP | 2012-521121 A | 9/2012 |
| JP | 2012-244610 A | 12/2012 |
| JP | 2013-070402 A | 4/2013 |
| JP | 2013-513279 A | 4/2013 |
| WO | 2012171585 A1 | 12/2012 |

OTHER PUBLICATIONS

International Search Report issued in PCT/JP2014/084481 dated Feb. 10, 2015 (1 page).
Written Opinion of the International Searching Authority issued in PCT/JP2014/084481 dated Feb. 10, 2015 (4 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects; (Release 9)"; Mar. 2010 (107 pages).

\* cited by examiner

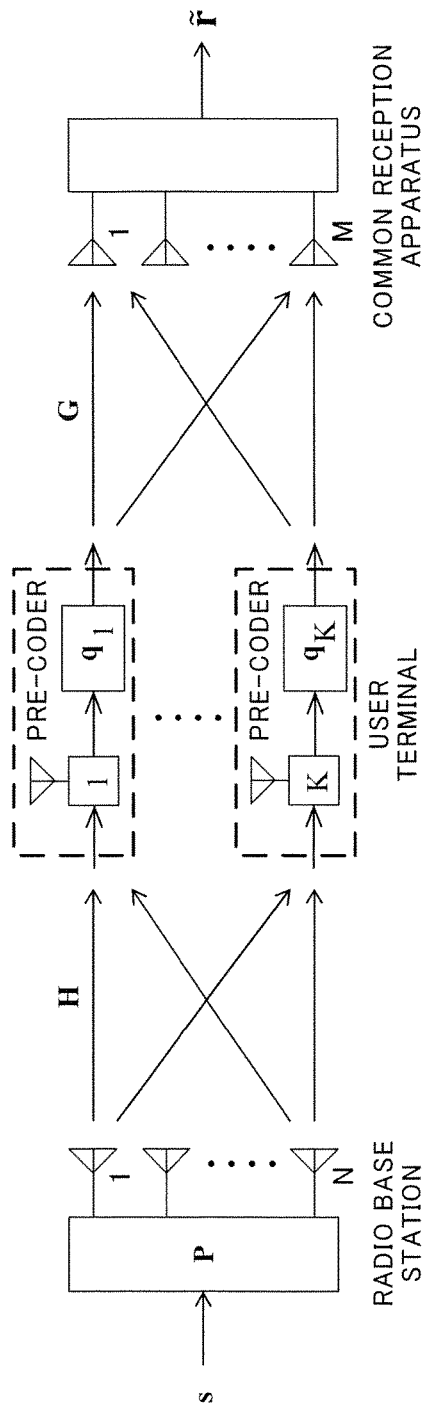
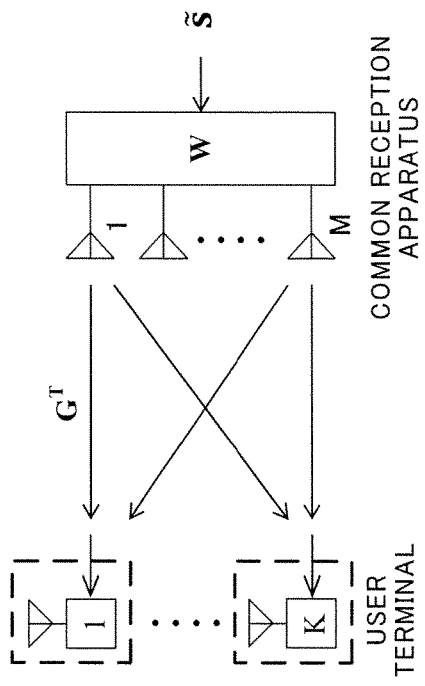
FIG.4A
FIG.4B

RADIO COMMUNICATION SYSTEM, COMMON RECEPTION APPARATUS AND USER TERMINAL

TECHNICAL FIELD

The present invention relates to a radio communication system, common reception apparatus and user terminal in mobile communications (group mobility) in a plurality of terminals existing in the same moving object.

BACKGROUND ART

In LTE (Long Term Evolution) and a successor system (for example, also referred to as LTE-Advanced, FRA (Future Radio Access), 4G and the like) to LTE, radio communication systems (for example, also referred to as Heterogeneous network) have been studied in which a small cell (including a picocell, femtocell and the like) having relatively small coverage with a radius of about several meters to several tens of meters is arranged, while overlapping a macrocell having relatively large coverage with a radius of about several hundreds of meters to several kilometers (for example, Non-patent Literature 1).

In such a radio communication system are studied a scenario (for example, also referred to as co-channel) using the same frequency band in both the macrocell and the small call, and another scenario (for example, also referred to as separate frequency) using different frequency bands in the macrocell and the small cell. More specifically, in the latter scenario, it is studied that a relatively low frequency band (for example, 2 GHz) is used in the macrocell, and that a relatively high frequency band (for example, 3.5 GHz, 10 GHz and the like) is used in the small cell.

CITATION LIST

Non-Patent Literature

[Non-patent Literature 1] 3GPP TR 36.814 "E-UTRA Further advancements for E-UTRA physical layer aspects"

SUMMARY OF INVENTION

Technical Problem

In addition, in the conventional radio communication system, in mobile communications (also referred to as Group Mobility, GM and the like) in a plurality of terminals existing inside the same moving object (for example, train, bus, ship and the like), each of the terminals communicates with a radio base station individually. Therefore, there is the risk that system performance is reduced due to inter-terminal interference inside the moving object and the like. Particularly, in the case where the moving speed of the moving object including a plurality of user terminals is high speed, there is the problem that reduction in system performance is remarkable.

The present invention was made in view of such a respect, and it is an object of the invention to provide a radio communication system, common reception apparatus and user terminal for suppressing reduction in system performance even when a plurality of terminals exists inside the same moving object.

Solution to Problem

A radio communication system of the present invention is a radio communication system for a plurality of user terminals existing inside a moving object and a radio base station, and is characterized in that the user terminal has a reception section that receives a signal transmitted from the radio base station, and a transmission section that transmits a signal transmitted from the radio base station to a common reception apparatus disposed inside the moving object, the common reception apparatus has a received signal detecting section that detects a signal for each user terminal, based on signals transmitted from the plurality of user terminals, and a transmission section that transmits a detected signal to each user terminal, and that the user terminal receives the signal for the user terminal detected in the common reception apparatus in the reception section to demodulate.

Advantageous Effects of Invention

According to the present invention, it is possible to suppress reduction in system performance for mobile communications (group mobility) in a plurality of terminals existing inside the same moving object.

BRIEF DESCRIPTION OF DRAWINGS

FIG. 4 contains explanatory diagrams of a system model of the radio communication system according to this Embodiment;

DESCRIPTION OF EMBODIMENTS

Figure 1:
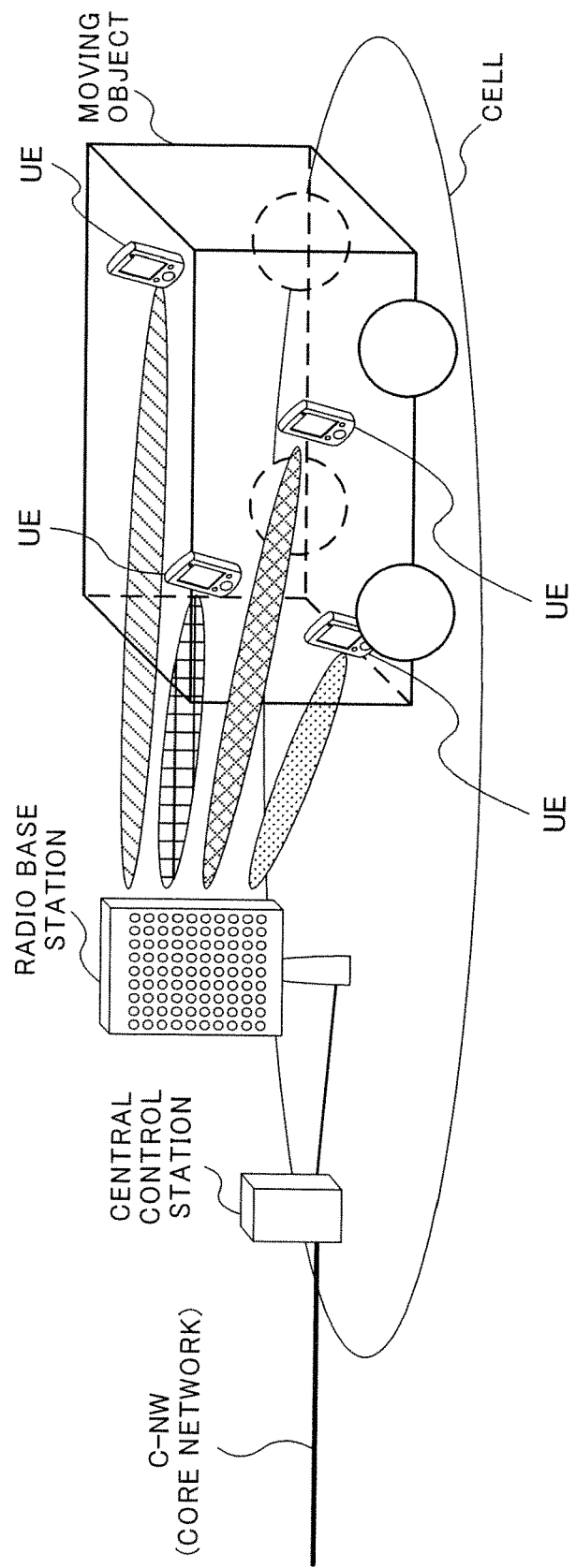
FIG. 1 is one example of a conceptual diagram of a network configuration to which is applied a radio communication system according to this Embodiment.

FIG. 1 is one example of a conceptual diagram of a network configuration to which is applied a radio communication system according to this Embodiment. The network configuration as shown in FIG. 1 includes a radio base station for forming a cell, and user terminals (UE: User Equipment) for communicating with the radio base station. In FIG. 1, a moving object (train) moves, and a plurality of user terminals is included inside the moving object. In addition, the user terminal in this Embodiment includes a mobile terminal apparatus and fixed terminal apparatus.

In the network configuration as shown in FIG. 1, the radio base station is connected to a central control station (also called a higher station apparatus and higher node). The central control station is connected to a core network. For example, the central control station includes an access gateway apparatus, Radio Network Controller (RNC), Mobility Management Entity (MME) and the like. In addition, a place to install the central control station is not limited particularly. Further, a configuration may be made where a part or the whole of functions of the central control station are provided in the radio base station.

In the conventional radio communication system, in mobile communications (also called Group mobility, GM and the like) in a plurality of terminals existing inside the same moving object (for example, train, bus, ship and the like), each of the terminals communicates with a radio base station individually. Therefore, there is the risk that system performance is reduced due to inter-terminal interference and the like.

For example, in FIG. 1, the description is given to the case of configuring a MU-MIMO (Multi User MIMO) system where a radio base station and a plurality of user terminals perform communications in the same radio resources (the same time/frequency channels). In radio downlink from the radio base station to the user terminal, the radio base station performs user multiplexing using a plurality of antennas, and based on channel state information (CSI) transmitted from the user terminal as feedback, needs to perform precoding so as not to generate inter-user interference. However, when the moving object moves at high speed, since time variations in CSI are large, it is difficult to perform precoding of high accuracy due to a time difference in feedback. Therefore, inter-terminal interference occurs, and communication performance degrades.

Figure 2:
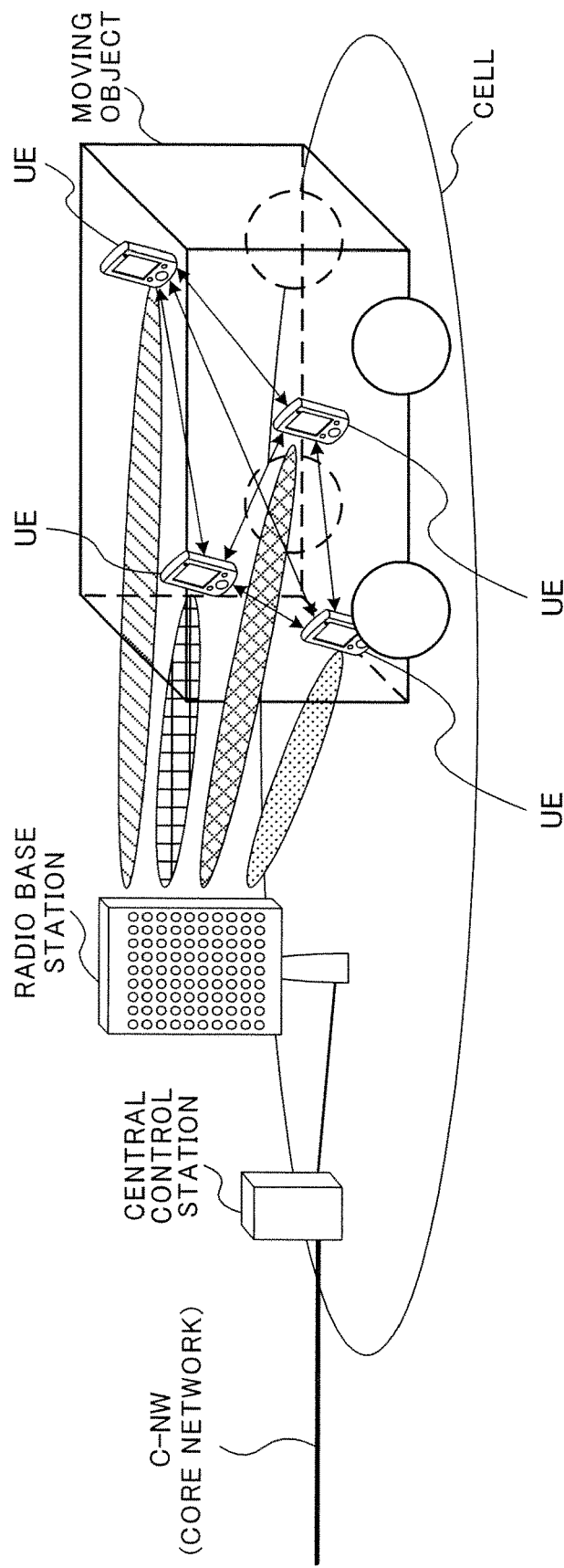
FIG. 2 is one example of a conceptual diagram of a configuration in which a plurality of user terminals inside a moving object directly cooperates with one another.

As measures against the above-mentioned problem in group mobility, it is considered that a plurality of user terminals inside the moving object cooperates with one another. For example, as shown in FIG. 2, the user terminals exchange control signals and transmission/received signals to perform transmission/reception processing in cooperation with one another, and it is thereby possible to increase the number of equivalent antennas, and to improve transmission/reception performance. In addition, in a plurality of user terminals existing inside the same moving object, as compared with a change in position of the moving object, since a change in relationship between mutual relative positions is extremely small, it is possible to perform stable short-distance communications between user terminals.

However, when a large number of user terminals exists inside the moving object, in using the above-mentioned cooperation scheme among user terminals, since it is necessary that a large number of user terminals needs to exchange signals, communication overhead increases by signal exchange. As a result, loads on the user terminals are large, and there is the risk that usage efficiency of radio resources is reduced.

Therefore, for group mobility, the inventors of the present invention conceived that signals received from a radio base station in user terminals inside a moving object are once collected in a common reception apparatus, the common reception apparatus collectively executes signal detection processing (common reception processing), and then returns a signal detection result to each user terminal, the user terminal demodulates the signal detection result to acquire data, and that it is thereby possible to cancel interference among user terminals to improve a multiplexing effect, while suppressing communication overhead. According to this configuration, it is possible to suppress reduction in system performance of the entire communication system.

Figure 3:
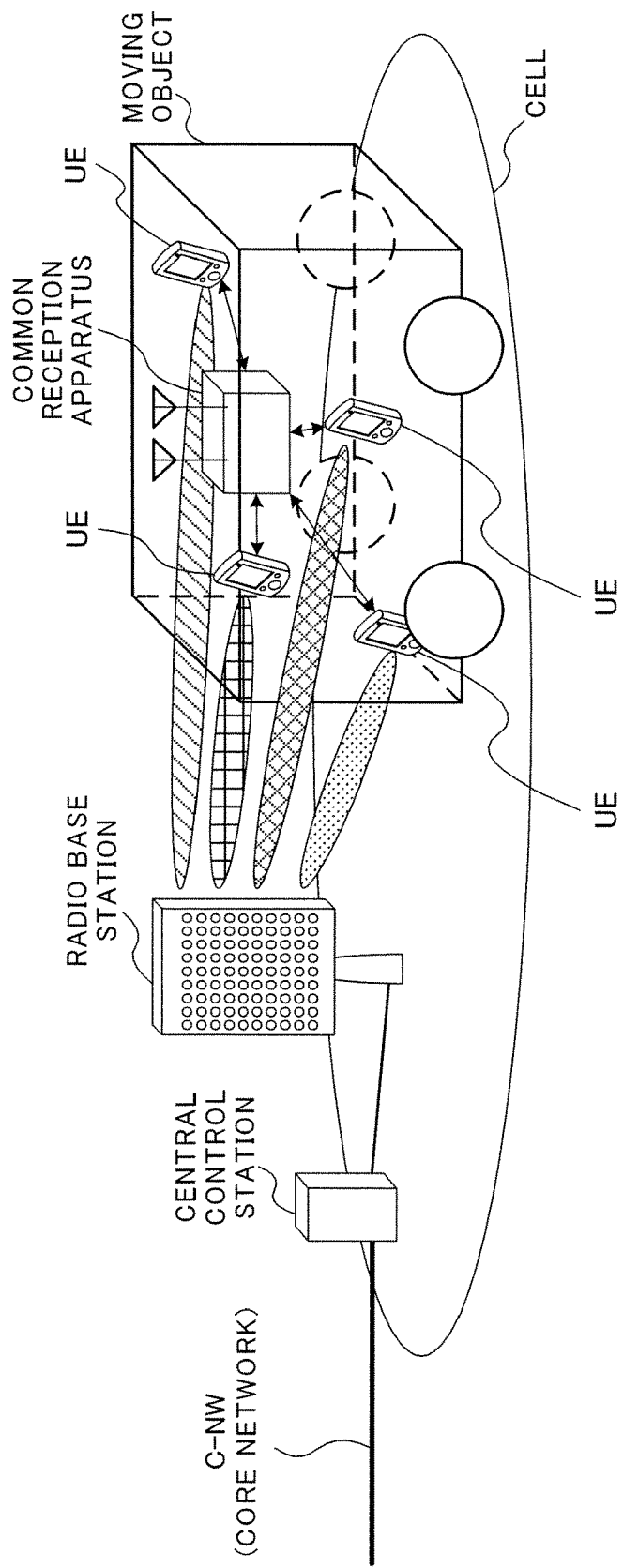
FIG. 3 is a schematic explanatory diagram of the radio communication system according to this Embodiment.

A radio communication system according to this Embodiment will specifically be described below. FIG. 3 is a schematic configuration diagram of the radio communication system according to this Embodiment. In FIG. 3, a common reception apparatus is arranged inside a moving object, and user terminals transmit signals (hereinafter, also referred to as temporary received signals) received from a radio base station to the common reception apparatus. By collectively using temporary received signals of a plurality of user terminals, it is possible to substantially increase the number of reception antennas corresponding to the number of user terminals, and it is possible to perform signal reception with high quality.

Further, since the relative position relationship between the user terminal and the common reception apparatus is relatively stable, it is considered that communication performance between the terminal and the apparatus is relatively high. Accordingly, delay caused by involvement of the common reception apparatus is small. Further, by leaving the received signal detection processing to the common reception apparatus, even in a user terminal with a simplified configuration, it is possible to divide signals with high quality.

Figure 5:
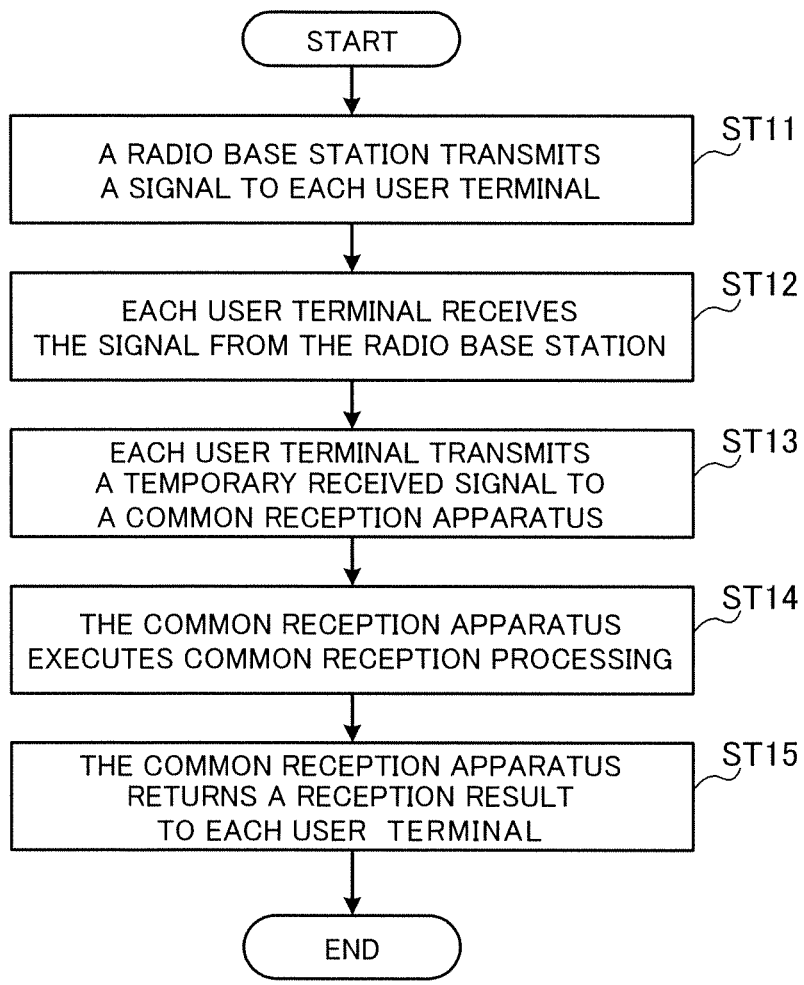
FIG. 5 is a flowchart illustrating common reception processing according to this Embodiment.

Referring to FIGS. 4 and 5, described is signal processing achieved by the radio communication system according to this Embodiment. FIG. 4 contains explanatory diagrams of a system model of the radio communication system according to this Embodiment. Further, FIG. 5 is a flowchart illustrating common reception processing according to this Embodiment. FIG. 5 will be referred to below in association with the explanation of FIG. 4.

In FIG. 4, the number of transmission antennas of the base station is represented by N, the number of user terminals is represented by K, and the number of reception antennas of the common reception apparatus is represented by M. Further, the number of antennas of a user terminal according to this Embodiment may be one or more, and FIG. 4 illustrates the case where the number of antennas is one, as an example.

FIG. 4A illustrates a system model for a period during which a signal transmitted from the radio base station arrives at the common reception apparatus via the user terminal, and FIG. 4B illustrates the system model in which a received signal detected in the common reception apparatus is returned to the user terminal. Further, the former figure corresponds to steps ST11 to ST13 in FIG. 5, and the latter figure corresponds to steps ST14 and ST15 in FIG. 5.

First, the radio base station performs precoding on a data signal s (K-dimensional vector) using a precoding matrix P (N×K matrix) to transmit a signal to a user terminal (step ST11 in FIG. 5).

Next, each user terminal receives the signal transmitted from the radio base station (step ST12 in FIG. 5). Herein, the signal undergoes effects of radio channels until the signal transmitted from the radio base station is received in the user terminal. Since radio channels exist corresponding to the number of transmission antennas, a channel response $h_k$ from the radio base station to the kth (k=1, . . . , K) user terminal is represented by an N-dimensional vector.

In consideration of the forgoing, a temporary received signal $r_k$ in the kth user terminal is represented by Equation 1.

$$r_k = h_k^T Ps + n_k \quad \text{(Equation 1)}$$

Herein, $n_k$ is noise.

From Equation 1, a temporary received signal r (K-dimensional vector) in the case of collectively considering the user terminals is represented by Equation 2.

$$r = H^T Ps + n \quad \text{(Equation 2)}$$

$$\text{Herein, } r = \begin{pmatrix} r_1 \\ r_2 \\ \vdots \\ r_K \end{pmatrix}, H^T = \begin{pmatrix} h_1^T \\ h_2^T \\ \vdots \\ h_K^T \end{pmatrix}, \text{ and } n = \begin{pmatrix} n_1 \\ n_2 \\ \vdots \\ n_K \end{pmatrix}.$$

Next, the kth user terminal transmits the temporary received signal $r_k$ to the common reception apparatus (step ST13 in FIG. 5). At this point, the terminal performs precoding on the temporary received signal $r_k$ using a precoding weight $q_k$ to transmit. Herein, a K×K diagonal matrix with $q_k$ as a component (diagonal component) with k-th row and k-th column is expressed as a precoding matrix Q.

The signal undergoes effects of radio channels until the signal transmitted from each user terminal is received in the common reception apparatus. Herein, when a channel response between the kth user terminal and the common reception apparatus is expressed as $g_k$ (N-dimensional vector), a channel matrix G (M×K matrix) between each user terminal and the common reception apparatus is $G = (g_1\ g_2\ \ldots\ g_K)$.

In consideration of the foregoing, a received signal $\tilde{r}$ (M-dimensional vector) in the common reception apparatus is expressed by Equation 3.

$$\begin{aligned}\tilde{r} &= GQr + \tilde{n} \\ &= GQH^T Ps + GQn + \tilde{n} \\ &= Cs + n'\end{aligned} \quad \text{(Equation 3)}$$

Herein, $C = GQH^T P$, $\tilde{n}$ is noise, and $n' = GQn + \tilde{n}$. C is an equivalent channel matrix on the signal s arriving at the common reception apparatus via each user terminal from the radio base station.

The common reception apparatus collectively performs signal detection processing (common reception processing), and detects a received signal $\tilde{s}$ (K-dimensional vector) of each user terminal from the received signal $\tilde{r}$ (step ST14 in FIG. 5). For detection of the received signal, for example, it is possible to use Successive Interference Cancellation (SIC), Maximum Likelihood Detection (MLD) and the like.

Next, the common reception apparatus performs precoding on the detected received signal using a precoding matrix W (M×M matrix) to return to each user terminal (step ST15 in FIG. 5). Herein, since it is considered that the channel matrix between the common reception apparatus and each user terminal is stable and that a variation is small, it is possible to regard the channel matrix from the common reception apparatus to each user terminal as $G^T$. In consideration of the foregoing, a received signal Y (K-dimensional vector) collectively expressing received signals that each user terminal receives from the common reception apparatus is expressed by Equation 4.

$$Y = G^T W \tilde{s} + \tilde{n}' \quad \text{(Equation 4)}$$

Herein, $\tilde{n}'$ is noise.

Comparing between Equation 2 and Equation 4, the signal (temporary received signal) itself that is directly received from the radio base station is affected by the channel matrix H with large time variations, and in contrast thereto, the detected signal that is received from the common reception apparatus is affected by only the channel matrix G of stable high quality. Accordingly, it is possible to receive a signal of high quality by using the received signal detected by the common reception apparatus.

Figure 6:
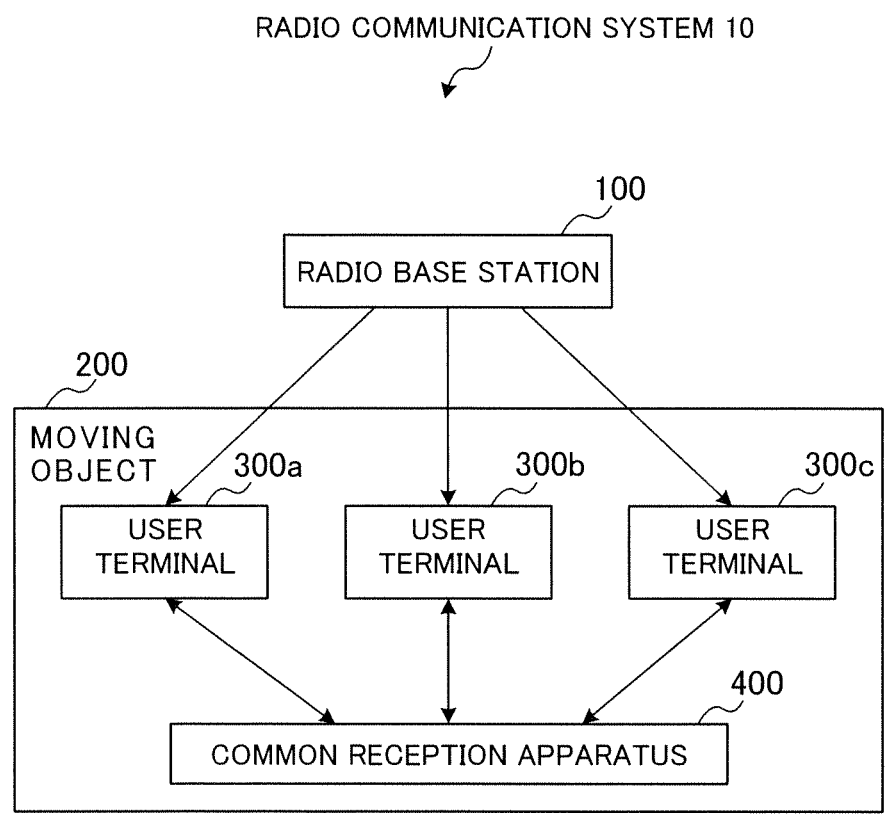
FIG. 6 is a block diagram of the radio communication system according to this Embodiment.

A configuration of a radio communication system according to this Embodiment will be described below with reference to FIG. 6. FIG. 6 is a block diagram of the radio communication system (radio communication system 10) according to this Embodiment. As shown in FIG. 6, the radio communication system 10 is comprised of a radio base station 100 for forming a cell, a moving object 200, a plurality of user terminals 300 included in the moving object 200, and a common reception apparatus 400 mounted on the moving object 200. For convenience, FIG. 6 shows the configuration with three user terminals 300 (user terminals 300a to 300c) inside the moving object 200, but the number of user terminals is not limited thereto. Further, for example, the radio communication system 10 as shown in FIG. 6 may be an LTE system, LTE-A system, IMT-Advanced, 4G, FRA (Future Radio Access) and the like. Furthermore, the configuration of the radio communication system according to this Embodiment is not limited to the configuration as shown in FIG. 6.

Moreover, FIG. 6 shows the example in which all user terminals 300 (300a to 300c) included in the moving object 200 transfer signals to the common reception apparatus 400, and a configuration may be made where only a user terminal group comprised of a part of user terminals transfers signals among user terminals 300 existing inside the moving object 200.

The radio base station 100 forms a predetermined cell to execute communications with the user terminals 300. In this Embodiment, the radio base station 100 is not limited particularly. For example, the radio base station 100 may be a radio base station (macro base station) for forming a cell (macrocell) that has relatively wide coverage. Further, the radio base station 100 may be a radio base station (small base station) for forming a cell (small cell) that has local coverage. In addition, the macro base station may be called MeNB (Macro eNodeB), transmission point, eNodeB (eNB), and the like. Furthermore, the small base station may be called SeNB (Small eNodeB), RRH (Remote Radio Head), pico-base station, femto-base station, Home eNodeB, transmission point, eNodeB (eNB) and the like.

A transmission/reception antenna of the radio base station 100 has a MIMO (Multiple Input Multiple Output) configuration having a plurality of antenna elements. According to the configuration, using beam forming, it is possible to suitably follow movement of the moving object 200 and ensure stable communication quality.

Herein, the beam forming (BF) is a technique for controlling amplitude and phases of respective transmission/received signals in a plurality of antenna elements, thereby providing a transmission/reception beam with directivity, and also enabling a shape of the beam to be changed. In this beam forming, generally, as the number of antenna elements increases, it is possible to perform more sophisticated control. In other words, corresponding to the number of antenna elements, it is possible to control the number of beams, the shape of each beam (width of the beam in a horizontal plane, width of the beam in a vertical plane, etc.) and the direction and gain of the beam in detail. For example, by narrowing the width of the beam (i.e., forming a narrow beam), it is possible to obtain high gain (power density).

The radio base station 100 calculates an Angle of Departure (AoD) using the complex conjugate transpose of the channel matrix H, applies beam forming using a precoding weight selected based on the AoD, and performs spatial division multiplexing on a plurality of user terminals 300 inside the moving object 200. Further, the station may use the same radio resources in communications with a plurality of user terminals 300 inside the moving object 200 that transfers signals to the common reception apparatus 400.

In addition, the channel matrix H is obtained from feedback information such as channel state information (CSI) from the user terminal. Further, since it is considered that a time variation is large in the channel between the radio base station and the user terminal inside the moving object, it is preferable to use a time mean value for the channel matrix H. Furthermore, beam forming may be made in the direction of the user terminal, by detecting the direction of arrival of the signal transmitted from the user terminal, or estimating the direction of the user terminal.

Herein, the direction of the user terminal is capable of being acquired also with control information and/or database. For example, the direction of the user terminal may be estimated by acquiring a rough position of the moving object 200 from a database based on the current time and the like, or information on a geographic position may be received from the central control station. In addition, to acquire the information on the geographic position, for example, it is possible to use GPS (Global Positioning System), scanning range sensor (also referred to as laser scanner), and the like.

In addition, when the transmission/reception antenna of the radio base station 100 is of a Massive-MIMO (also referred to as three-dimensional (3D)/Massive MIMO) configuration having a large number (for example, 100 or more) of antenna elements, more sophisticated beam forming is made possible, and communication of higher quality is made possible.

Herein, the Massive-MIMO transmission scheme is a technique for improving a data rate (frequency usage efficiency) by transmitting data using a large number of antenna elements. Since data is transmitted using a large number of antenna elements, it is possible to improve transmission efficiency associated with multiplexing as compared with the case of using a small number of antenna elements, and it is possible to perform radio communication at higher speed than conventional communication. Further, sophisticated beam forming is made possible by combinations of a large number of antenna elements.

The moving object 200 is a moving object, and for example, is a train, car, bus, ship and the like. In addition, a moving path of the moving object 200 is not limited particularly. In other words, the moving object 200 may be an object that moves according to a predetermined path, or an object that moves freely without regularity.

The user terminal 300 is a terminal supporting various types of communication schemes such as LTE, LTE-A and FRA, and is capable of communicating with the radio base station 100 by itself. Further, the user terminal 300 transfers a signal received from the radio base station 100 to the common reception apparatus 400. In addition, the user terminal according to this Embodiment may include a fixed communication terminal as well as the mobile communication terminal.

As described above, the kth user terminal performs precoding on the temporary received signal $r_k$ using the precoding weight $q_k$ to transmit to the common reception apparatus. Herein, when the number of transmission/reception antennas that the user terminal has is one, the precoding matrix Q in consideration of all user terminals is a diagonal matrix with scalars $q_k$ as diagonal components. In other words, precoding in this case functions so as to increase or decrease power of the temporary received signal. For example, by using a large value as $q_k$ when reception power of the temporary received signal is low, or using a small value as $q_k$ when reception power of the temporary received signal is high, it is possible to uniform reception levels of transfer signals in the common reception apparatus. By this means, it is possible to reduce a dynamic range of the common reception apparatus.

Further, when the number of transmission/reception antennas that the user terminal has is two or more, the precoding matrix Q in consideration of all user terminals is a block diagonal matrix with matrixes $q_k$ corresponding to the number of antennas as diagonal components. Precoding in this case is capable of being controlled to form a beam having the directivity to the common reception apparatus. Accordingly, it is possible to perform precoding corresponding to the position of the user terminal and channel state.

The common reception apparatus 400 receives temporary received signals from a plurality of user terminals 300, and collectively performs detection (common reception processing) of received signals. Then, the apparatus returns the detected received signal to each user terminal. In addition, in this Embodiment, the common reception apparatus 400 is made the configuration of not directly transmitting and receiving signals to/from the radio base station 100, but the invention is not limited thereto.

For detection of the received signal, it is possible to use Successive Interference Cancellation (SIC), Maximum Likelihood Detection (MLD) and the like. For example, in the case of using SIC, the apparatus performs non-linear interference cancellation on each of temporary received signals collected in the common reception apparatus until the received signal of each user terminal is detected. The cancellation is to generate a replica that is an estimation value of the received signal using a soft decision channel decoded signal in descending order of Signal to Interference plus Noise Ratio (SINR), and remove the replica from the received signal of each user terminal.

In addition, with respect to SINR in this Embodiment, interference among user terminals that perform common reception is considered a signal (S). In other words, interference (I) is interference from another cell and the like, and does not include interference among user terminals.

The apparatus returns the detected received signal using an optimal transmission method, corresponding to a channel state from the common reception apparatus to each user terminal. At this point, the apparatus may use a method different from the transmission method used in communications from the radio base station to the user terminal. For example, it is possible to change the modulation level, coding method, coding rate, communication scheme and the like appropriately. In addition, also in the case where the user terminal transmits the temporary received signal to the common reception apparatus, similarly, corresponding to the channel state, the terminal may transmit using an optimal transmission method.

Further, as the method of returning the detected signal, it is possible to use methods other than radio communications. For example, with illumination (LED illumination, organic EL illumination and the like) inside the moving object, visible-light communications may be used using an electromagnetic wave with a visible light band. Furthermore, a communication connector for wired connection to the common reception apparatus may be provided inside the moving object, and the user terminal may connect to the communication connector to perform wired communications with the common reception apparatus.

Moreover, for transmission/reception of the signal according to the common reception apparatus, it is possible to improve communication efficiency by using multiplexing techniques. For example, using a plurality of transmission/reception antennas mounted on the common reception apparatus, the apparatus may concurrently receive temporary received signals transmitted from a plurality of user terminals (spatial division multiplexing). Further, time division multiplexing, frequency division multiplexing and the like may be applied to a radio link between the user terminal and the common reception apparatus.

As described above, according to the radio communication system according to this Embodiment, for group mobility, signals received from the radio base station in the user terminals inside the moving object are once collected in the common reception apparatus without any processing, and the common reception apparatus collectively executes the signal detection processing, and then returns a signal detection result to each user terminal. By this means, it is possible to cancel interference among user terminals to improve the multiplexing effect, while suppressing communication overhead, and it is possible to suppress reduction in system performance of the entire radio communication system.

(Selection of User Terminals)

In the above-mentioned common reception processing, instead of using all user terminals inside the moving object, by executing on a particular user terminal group, it is conceivable that the reduction in system performance is capable of being suppressed effectively. Therefore, in the radio communication system according to this Embodiment, it is possible to make a configuration that only user terminals, which are selected from among user terminals existing inside the moving object as common reception targets for performing the common reception processing, are capable of transmitting signals from the radio base station to the common reception apparatus to execute the common reception processing. Described below is a method of selecting user terminals that are common reception targets.

Selection of user terminals is executed in one of the radio base station, common reception apparatus and central control station. When selection is executed except the radio base station, it is preferable that the selection result is notified to the radio base station. Further, it may be configured that the common reception apparatus determines selection candidates of user terminals, and notifies the radio base station, central control station and the like of information on the selection candidates, and that based on the information on the selection candidates, user terminals that are common reception targets are determined. For example, it is possible to make a configuration in which individual numbers (1-10) are assigned to a plurality of user terminals, and when the common reception apparatus determines user terminals 1, 3, 4 and 7 as selection candidates, the apparatus notifies the radio base station of information indicative of "1", "3", "4" and "7". Further, the radio base station is capable of determining common reception targets based on the notified information on the selection candidates, and notifying the common reception apparatus of information indicative of determined user terminals via the user terminal.

In addition, in this Embodiment, user terminals each having a communication request to the radio base station are selected, but the invention is not limited thereto. For example, it is possible to select a user terminal (in the so-called idle state) that does not have a communication request to the radio base station. In this case, it is possible to use a temporary received signal from the user terminal in the idle state to support signal detection of the user terminal in the non-idle state. Further, the common reception apparatus may not return the detection result of the received signal to the user terminal in the idle state.

In this Embodiment, the user terminal and common reception apparatus have a function of measuring reception quality. Then, the common reception targets are selected from user terminals such that a smaller value between reception quality of a radio link between the radio base station and the user terminal and reception quality of a radio link between the user terminal and the common reception apparatus is a predetermined value or more. For example, in the case of measuring SINR as the reception quality, the common reception targets are selected from user terminals such that a smaller value between SINR of the radio link between the radio base station and the user terminal and SINR of the radio link between the user terminal and the common reception apparatus is a predetermined value or more. By this means, it is possible to achieve detection of the received signal with accuracy. In addition, as described above, it should be noted that interference among user terminals is included in the S component, instead of the I component of SINR. Further, selection may be performed based on SNR (Signal to Noise Ratio), instead of SINR.

Further, it is possible to select so that selection of user terminals is comprised of terminals with larger channel responses. More specifically, in consideration of the whole of the channel response from the radio base station to the user terminal and the channel response from the user terminal to the common reception apparatus, user terminals are selected so that the channel on which the radio base station communicates with the common reception apparatus via the user terminal is excellent. For example, it is possible to calculate the level of the channel response by Frobenius norm of the channel response.

Furthermore, selection of user terminals may be determined so as to maximize the rank (class) of the equivalent channel matrix C shown in the above-mentioned Equation 3. More specifically, in the case of executing common reception with the predetermined number of user terminals, user terminals are selected so that the rank of C is maximum (=the predetermined number of user terminals).

In addition, for the number of user terminals that are common reception targets, the number may be changed as appropriate based on performance of the radio base station and common reception apparatus, channel state and the like. For example, in the case of executing selection of user terminals based on the reception quality, a further limited user terminal may be made the common reception target among user terminals such that the above-mentioned smaller value between two kinds of reception quality is a predetermined value or more. For example, it is possible to select a predetermined number of user terminals in descending order from user terminals such that the smaller value of reception quality is a predetermined value or more. Further, in order to exert the effect of common reception, it is preferable to select a plurality of user terminals, but the number of selected user terminals may be one.

(Channel Estimation)

In this Embodiment, the channel state between the radio base station and the user terminal and the channel state between the user terminal and the common reception apparatus are estimated and used in control. For the channel state between the radio base station and the user terminal, the radio base station multiplexes a predetermined orthogonal coding sequence into a signal to transmit to the user terminal, and each user terminal is thereby capable of estimating using the orthogonal coding sequence. Herein, as the signal multiplexed with the orthogonal coding sequence, by including a reference signal for channel estimation in radio resources, the user terminal is capable of executing channel estimation using the reference signal. For example, as the reference signal, CSI-RS (Channel State Information Reference Signal), DM-RS (DeModulation Reference Signal), CRS (Cell-specific Reference Signal) and the like used in the LTE-A system may be used.

For the channel state between the user terminal and the common reception apparatus, the user terminal time-multiplexes an orthogonal coding sequence into the temporary received signal to transmit to the common reception apparatus, and using the orthogonal coding sequence, the common reception apparatus is capable of executing channel estimation. Further, the common reception apparatus may transmit an orthogonal coding sequence to the user terminal, and the user terminal may execute channel estimation.

Further, in the case where the user terminal time-multiplexes the orthogonal coding sequence into the temporary received signal to transmit to the common reception apparatus, a configuration may be made where the common reception apparatus collectively estimates the channel state between the radio base station and the user terminal and the channel state between the user terminal and the common reception apparatus. In this case, the need for channel estimation processing is eliminated in the user terminal, and it is possible to reduce processing loads on the user terminal.

(Configurations of the Radio Base Station, User Terminal and Common Reception Apparatus)

Configurations of the radio base station 100, user terminal 300 and common reception apparatus 400 according to this Embodiment will be described below with reference to FIGS. 7 to 10.

Figure 7:
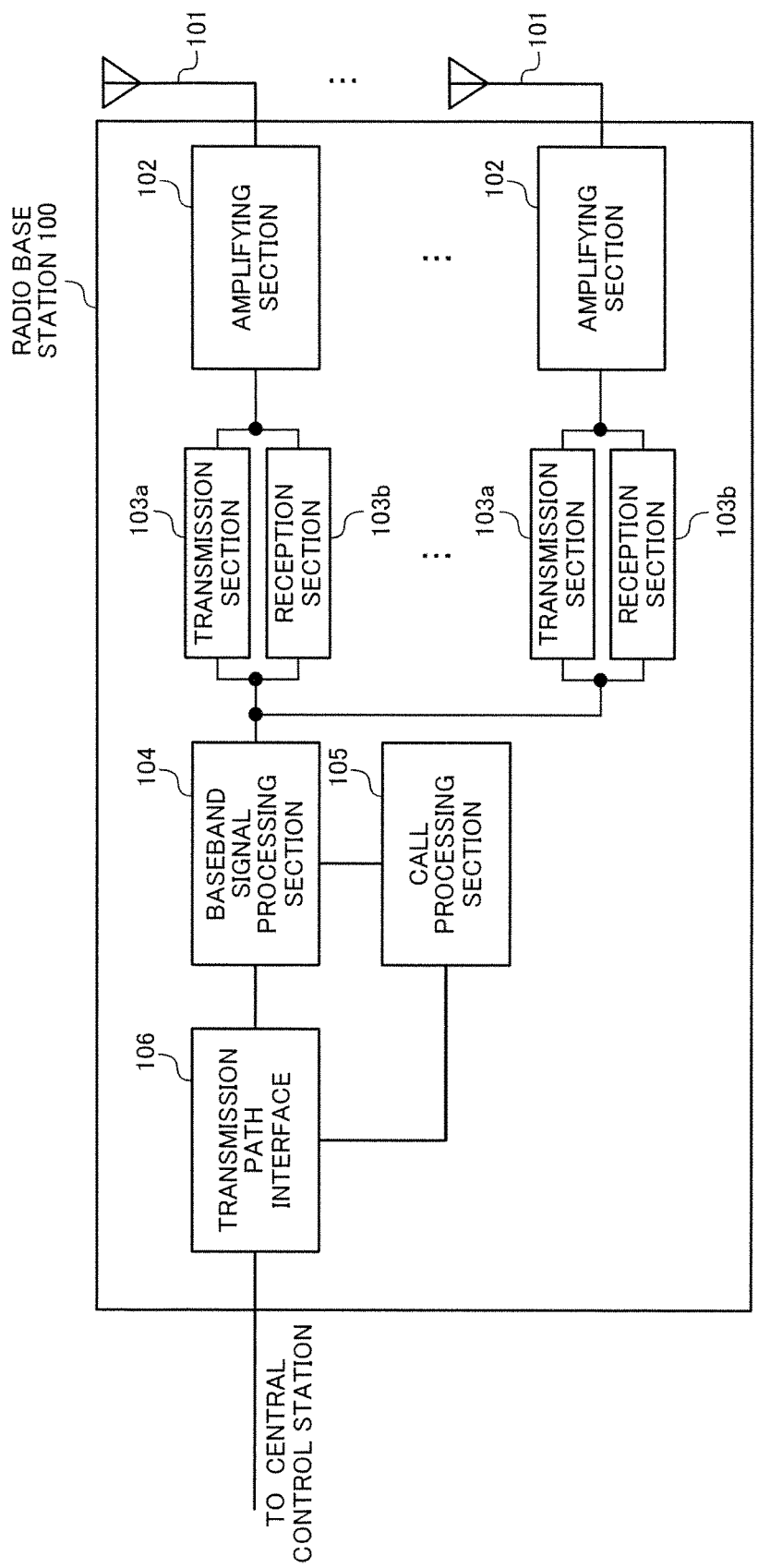
FIG. 7 is an entire configuration diagram of a radio base station according to this Embodiment.

FIG. 7 is an entire configuration diagram of the radio base station according to this Embodiment. As shown in FIG. 7, the radio base station 100 according to this Embodiment is provided with a plurality of transmission/reception antennas 101 for MIMO transmission, amplifying sections 102, transmission sections 103a, reception sections 103b, baseband signal processing section 104, call processing section 105, and transmission path interface 106. In addition, the plurality of transmission/reception antennas 101 may be comprised of antenna elements for Massive MIMO.

User data to transmit to the user terminal 300 from the radio base station 100 by downlink is input to the baseband signal processing section 104 from the central control station via the transmission path interface 106.

The baseband signal processing section 104 performs, on the input user data, processing of PDCP (Packet Data Convergence Protocol) layer, segmentation and concatenation of the user data, transmission processing of RLC (Radio Link Control) layer such as transmission processing of RLC retransmission control, MAC (Medium Access Control) retransmission control (for example, transmission processing of HARQ (Hybrid ARQ)), scheduling, transmission format selection, channel coding, DFT (Discrete Fourier Transform) processing, IFFT (Inverse Fast Fourier Transform) processing, precoding processing and the like to output to each of the transmission sections 103a. Further, also concerning a downlink control signal, the section 104 performs transmission processing such as channel coding and Inverse Fast Fourier Transform on the signal to output to each of the transmission sections 103a.

Further, in the precoding processing performed in the baseband signal processing section 104, for a plurality of user terminals 300 that are common reception targets determined in one of the radio base station 100, common reception apparatus 400 and central control station, weights are determined so that beam forming is performed toward directions of the user terminals. Herein, beam forming may be performed, based on feedback information from the user terminal such as CSI (Channel State Information) indicative of a channel state, AOA (Angle of Arrival) and AOD (Angle of Departure) used in weighting of antenna elements, and the like.

Furthermore, the baseband signal processing section 104 may perform scheduling so as to multiplex the orthogonal coding sequence into predetermined radio resources. Herein, as the signal multiplexed with the orthogonal coding sequence, by including a reference signal for channel estimation in radio resources, the user terminal is capable of executing channel estimation using the reference signal. For example, as the reference signal, CSI-RS, DM-RS, CRS and the like used in the LTE-A system may be used.

Each of the transmission sections 103a converts the downlink signal, which is subjected to precoding for each antenna and is output from the baseband signal processing 104, into a signal with a radio frequency band. The amplifying sections 102 amplify the radio-frequency signal subjected to frequency conversion, and transmit to a plurality of user terminals via the plurality of transmission/reception antennas 101, while performing spatial division multiplexing.

On the other hand, for an uplink signal, a radio-frequency signal received in each of the transmission/reception antennas 101 is amplified in respective one of the amplifying sections 102, is subjected to frequency conversion in respective one of the reception sections 103b and is thereby converted into a baseband signal, and the signal is input to the baseband signal processing section 104.

For user data included in the input uplink signal, the baseband signal processing section 104 performs FFT (Fast Fourier Transform) processing, IDFT (Inverse Discrete Fourier Transform) processing, error correcting decoding, reception processing of MAC retransmission control, reception processing of RLC layer and PDCP layer and the like to output to the central control station via the transmission path interface 106. The call processing section 105 performs call processing such as setting and release of a communication channel, state management of the base station, and management of radio resources.

Figure 8:
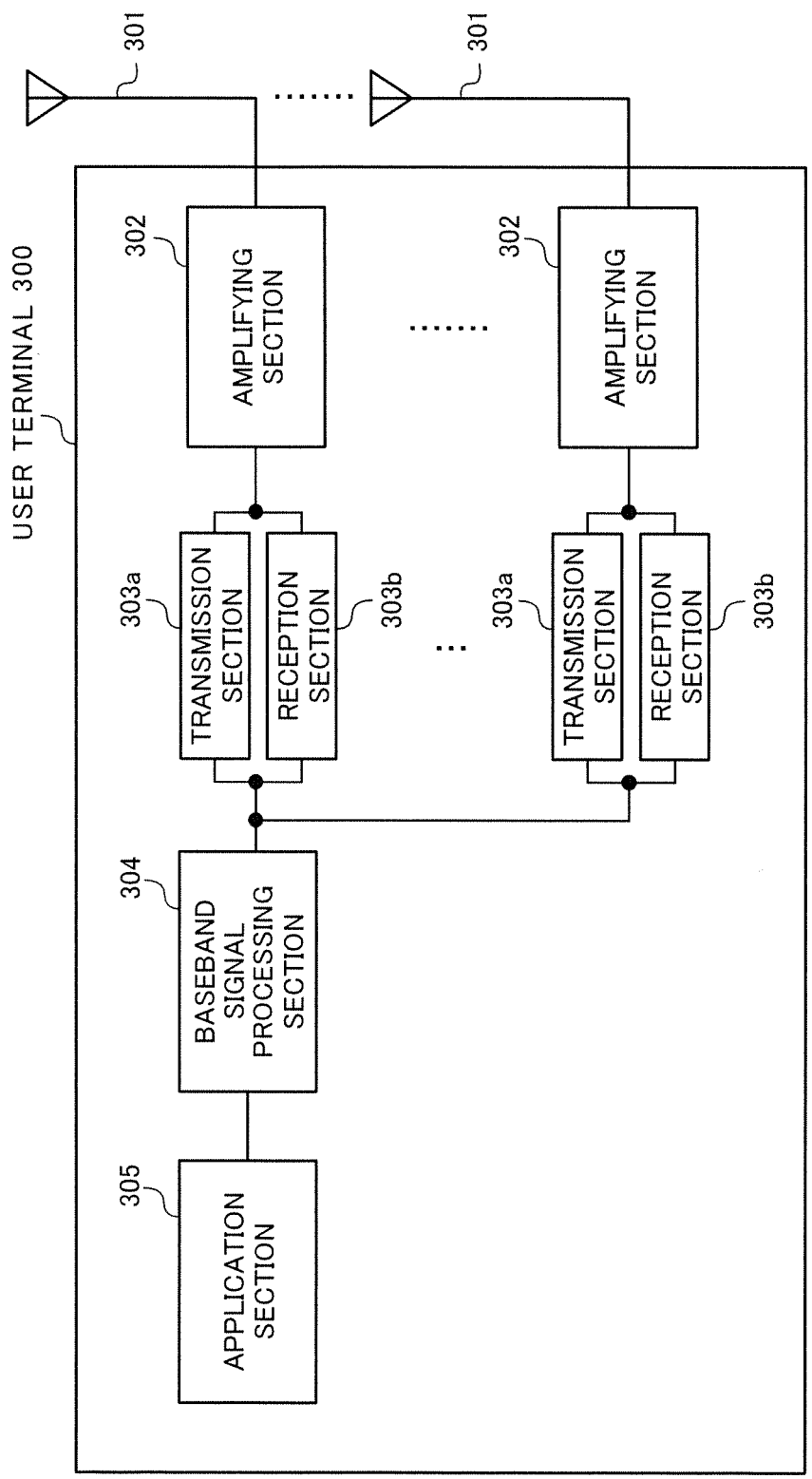
FIG. 8 is an entire configuration diagram of a user terminal according to this Embodiment.

FIG. 8 is an entire configuration diagram of the user terminal according to this Embodiment. As shown in FIG. 8, the user terminal 300 is provided with transmission/reception antennas 301, amplifying sections 302, transmission sections 303a, reception sections 303b, baseband signal processing section 304, and application section 305. In addition, the transmission/reception antenna 301 is preferably comprised of a plurality of antennas for MIMO transmission, and may be comprised of a single antenna.

For downlink signals, radio-frequency signals received in a plurality of transmission/reception antennas 301 are respectively amplified in the amplifying sections 302, are subjected to frequency conversion in the reception sections 303b, and are input to the baseband signal processing section 304. The baseband signal processing section 304 performs FFT processing, error correcting decoding, reception processing of retransmission control and the like to demodulate, and thereby extracts user data. The user data included in the downlink signals is output to the application section 305. The application section 305 performs processing concerning layers higher than physical layer and MAC layer, and the like. Further, among the downlink data, broadcast information is also output to the application section 305. Furthermore, also in the case of receiving a signal from the common reception apparatus 400, the section outputs user data and broadcast information, which is included in the signal and extracted by above-mentioned demodulation, to the application section 305.

When the user terminal 300 is notified of that the terminal is the common reception target from the radio base station 100 or common reception apparatus 400, the terminal performs precoding again on the signal (temporary received signal) input to the baseband signal processing 304 so as to increase or decrease power, outputs the resultant to each of the transmission sections 303a, and transfers to the common reception apparatus 400 via the amplifying section 302 by the transmission/reception antenna 301. Herein, precoding is executed so as to increase transmission power in the case where reception power of the temporary received signal is low, or to decrease transmission power in the case where reception power of the temporary received signal is high.

Further, the baseband signal processing section 304 that the user terminal 300 has estimates a channel state between the radio base station 100 and the user terminal 300, using a predetermined orthogonal coding sequence included in predetermined radio resources of the received signal. As the signal multiplexed with the orthogonal coding sequence, it is possible to use a reference signal for channel estimation. For example, as the reference signal, CSI-RS, DM-RS, CRS and the like may be used.

The baseband signal processing section 304 may perform scheduling of radio resources so as to time-multiplex an orthogonal coding sequence into the temporary received signal. By this means, using the orthogonal coding sequence, the common reception apparatus 400 is capable of executing channel estimation between the user terminal 300 and the common reception apparatus 400.

Further, a configuration may be made where the user terminal 300 receives a signal from the common reception apparatus 400, and using an orthogonal coding sequence included in predetermined radio resources of the received signal, executes channel estimation between the user terminal 300 and the common reception apparatus 400.

Furthermore, the user terminal 300 generates channel state information (CSI) corresponding to the channel state estimated in the user terminal 300 and/or the common reception apparatus 400 to output to the transmission sections 303a. In addition, CSI may include CQI (Channel Quality Indicator), PMI (Precoding Matrix Indicator), RI (Rank Indicator) and the like.

Still furthermore, the user terminal 300 may have a function of measuring SINR of a received signal from the radio base station 100 and/or the common reception apparatus 400 to transmit the measured SINR to the radio base station 100 and/or the common reception apparatus 400. By this means, it is possible to suitably determine a user terminal that is the common reception target.

On the other hand, for uplink user data, the data is input to the baseband signal processing section 304 from the application section 305. The baseband signal processing section 304 performs MAC retransmission control, channel coding, precoding, DFT processing, IFFT processing and the like to output to each of the transmission sections 303a. Each of the transmission/reception sections 303a converts the baseband signal output from the baseband signal processing section 304 into a signal with a radio frequency band. Subsequently, each of the amplifying sections 302 amplifies the radio-frequency signal subjected to frequency conversion to transmit from respective one of the transmission/reception antennas 301.

Figure 9:
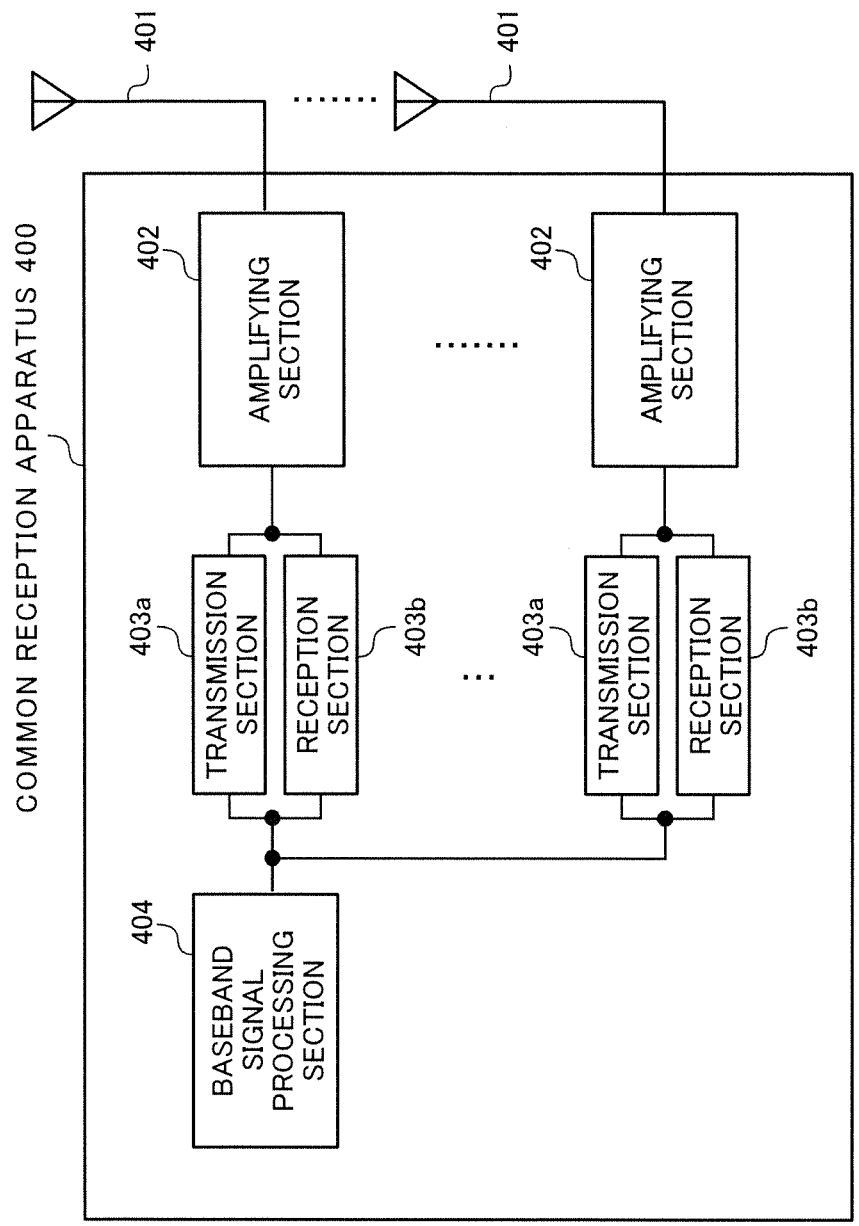
FIG. 9 is an entire configuration diagram of a common reception apparatus according to this Embodiment.

FIG. 9 is an entire configuration diagram of the common reception apparatus according to this Embodiment. As shown in FIG. 9, the common reception apparatus 400 is provided with transmission/reception antennas 401, amplifying sections 402, transmission sections 403a, reception sections 403b, and baseband signal processing section 404. In addition, the transmission/reception antenna 401 is preferably comprised of a plurality of antennas for MIMO transmission, and may be comprised of a single antenna.

For the temporary received signal from the user terminal 300, radio-frequency signals received in a plurality of transmission/reception antennas 401 are respectively amplified in the amplifying sections 402, are subjected to frequency conversion in the reception sections 403b, and are input to the baseband signal processing section 404. The baseband signal processing section 404 performs FFT processing, error correcting decoding, reception processing of retransmission control and the like. Further, using temporary received signals acquired from a plurality of user terminals 300, the baseband signal processing section 404 collectively performs detection of received signals.

For a signal such as the detected received signal of each user terminal to transmit to the outside, the baseband signal processing 404 performs MAC retransmission control, channel coding, precoding, DFT processing, IFFT processing and the like to output to each of the transmission sections 403a. Each of the transmission sections 403a converts the baseband signal output from the baseband signal processing section 404 to a signal with a radio-frequency signal. Subsequently, each of the amplifying sections 402 amplifies the radio-frequency signal subjected to frequency conversion to transmit with respective one of the transmission/reception antennas 401.

Further, as the method of returning the detected signal, methods other than radio communications may be used, and for example, in the case where the common reception apparatus 400 is capable of controlling illumination (LED illumination, organic EL illumination and the like) inside the moving object 200, the apparatus may perform visible-light communications using an electromagnetic wave with a visible light band by the illumination to notify the user terminal 300 of the received signal. Furthermore, in the case that a communication connector for wired connection to the common reception apparatus 400 is provided inside the moving object 200, and that the user terminal 300 is connected to the communication connector, the common reception apparatus 400 may notify the user terminal 300 of the received signal by wired communications.

Figure 10:
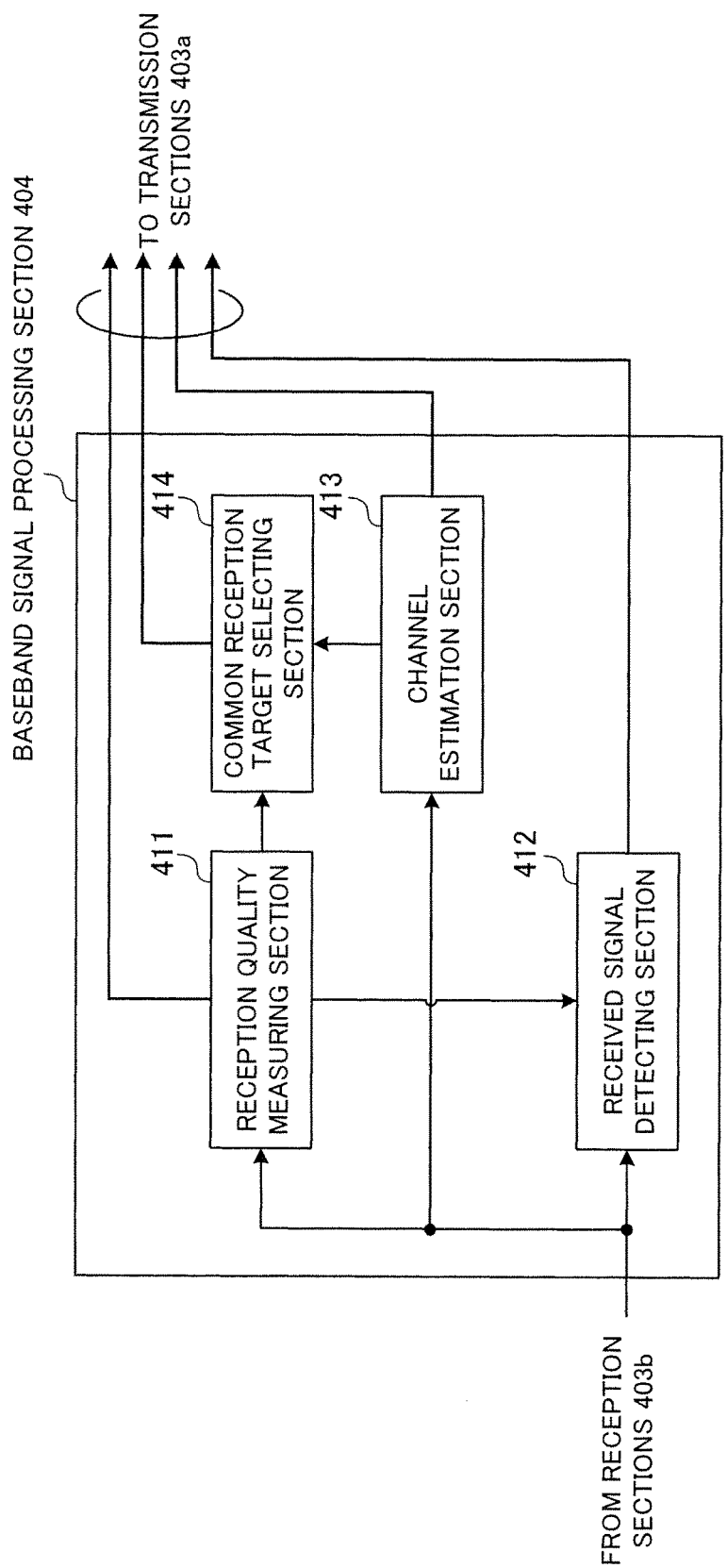
FIG. 10 is a block diagram showing a configuration example of a baseband signal processing section of the common reception apparatus according to this Embodiment.

FIG. 10 is a block diagram showing a configuration example of the baseband signal processing section of the common reception apparatus according to this Embodiment. In addition, although FIG. 10 shows only a part of the configuration, it is assumed that the common reception apparatus 400 is provided with necessary configurations in full measure.

The baseband signal processing section 404 has a reception quality measuring section 411, received signal detecting section 412, channel estimation section 413, and common reception target selecting section 414. The received signal output from the reception section 403b is input to the reception quality measuring section 411, received signal detecting section 412, and channel estimation section 413.

The reception quality measuring section 411 measures quality of the received signal from the user terminal 300. Herein, as the quality of the received signal, it is possible to use Signal to Interference plus Noise Ratio (SINR), SNR (Signal to Noise Ratio), RSRP (Reference Signal Received Power) and the like. In addition, in the case of using SINR, interference among user terminals 300 that are common reception targets inside the moving object 200 is included in the S component, instead of the I component of SINR.

Using temporary received signals acquired from a plurality of user terminals 300, the received signal detecting section 410 collectively performs detection of received signals. For detection of the received signal, it is possible to use Successive Interference Cancellation (SIC), Maximum Likelihood Detection (MLD) and the like. In addition, information on transmission power of temporary received power in each user terminal and the like may be used in interference cancellation.

The channel estimation section 413 estimates a channel state of a radio link. More specifically, in the case of receiving an orthogonal coding sequence allocated to predetermined radio resources from the user terminal, using the orthogonal coding sequence, the section executes channel estimation between the user terminal 300 and the common reception apparatus 400. Further, a configuration may be made where the channel estimation section 413 collectively estimates the channel state between the radio base station 100 and the user terminal 300, and the channel state between the user terminal 300 and the common reception apparatus 400.

On the other hand, a configuration may also be made where the common reception apparatus 400 does not have the channel estimation section 413. In this case, it may be configured that the common reception apparatus 400 allocates an orthogonal coding sequence to predetermined radio resources to transmit to the user terminal 300, and that using the orthogonal coding sequence, the user terminal 300 executes channel estimation between the user terminal 300 and the common reception apparatus 400.

The common reception target selecting section 414 selects common reception targets to collectively execute the signal detection processing (common reception processing) from among user terminals 300 existing inside the moving object. Further, a configuration may be made where the common reception target selecting section 414 determines selection candidates of user terminals 300, and notifies the radio base station 100 and the like of information on the selection candidates, and based on the information on the selection candidates, user terminals 300 that are common reception targets are determined.

With respect to selection of common reception targets and determination of selection candidates for common reception targets, the common reception target selecting section 414 is capable of executing, based on the quality of the received signal measured in the reception quality measuring section 411, channel estimation result estimated in the channel estimation section 413 and the like. Further, in the selection and determination, the apparatus may receive information on the reception quality and/or the channel state according to one of radio links between the radio base station and the user terminal, and between the user terminal and the common reception apparatus to use.

In addition, it is preferable that the quality of the received signal measured in the reception quality measuring section 411 is notified to the user terminal 300 and/or the radio base station 100. Further, it is preferable that the channel estimation result estimated in the channel estimation section 413 is notified to the user terminal 300 and/or the radio base station 100. Furthermore, it is preferable that the information on common reception targets selected in the common reception target selecting section 414 is notified to the user terminal 300 and/or the radio base station 100.

Moreover, this Embodiment shows the configuration where the common reception apparatus 400 includes the common reception target selecting section 414, but the invention is not limited thereto. For example, a configuration may be made where the radio base station 100 has the common reception target selecting section 414, selects common reception targets with feedback information from the user terminal, and notifies the user terminal 300 and the common reception apparatus 400.

As described above, according to the radio communication system according to this Embodiment, for group mobility, signals received from the radio base station in the user terminals inside the moving object are once collected in the common reception apparatus without any processing, and the common reception apparatus collectively executes the signal detection processing, and then returns a signal detection result to each user terminal. By this means, it is possible to cancel interference among user terminals to improve the multiplexing effect, while suppressing communication overhead, and it is possible to suppress reduction in system performance of the entire radio communication system.

As described above, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2013-271080 filed on Dec. 27, 2013, entire content of which is expressly incorporated by reference herein.

The invention claimed is:

1. A radio communication system comprising:
   a plurality of user terminals that exist inside a moving object; and
   a common reception apparatus disposed inside the moving object;
   wherein each of the user terminals comprises:
      a first receiver that receives a signal transmitted from a radio base station; and
      a first transmitter that transmits, to the common reception apparatus, a signal transmitted from the radio base station,
   wherein the common reception apparatus comprises:
      a second receiver that receives signals transmitted from the user terminals;
      a second processor that detects, by using the signals received from the user terminals, a signal addressed to each user terminal; and
      a second transmitter that transmits the detected signal to a corresponding user terminal, and
   wherein the first receiver receives a signal transmitted from the common reception apparatus,
   wherein each of the user terminals further comprises a first processor that demodulates the signal transmitted from the common reception apparatus,
   wherein the first processor of a user terminal of the plurality of user terminals time-multiplexes an orthogonal coding sequence into the signal transmitted from the radio base station to transmit to the common reception apparatus,
   wherein the second processor of the common reception apparatus estimates a channel state of a radio link, wherein the second processor of the common reception apparatus estimates a channel state of a radio link between the user terminal and the common reception apparatus, based on the orthogonal coding sequence included in the signal transmitted from the user terminal, wherein the second processor of the common reception apparatus detects a signal for a predetermined user terminal selected, as a common reception target to perform common reception processing, from among the plurality of user terminals that exist inside the moving object, and wherein the common reception target is selected from the plurality of user terminals such that a smaller value between reception quality of a radio link between the radio base station and the predetermined user terminal and reception quality of a radio link between the predetermined user terminal and the common reception apparatus is a predetermined value or more.

2. The radio communication system according to claim 1, wherein based on the signal received from the radio base station included in the signal transferred from a user terminal of the plurality of user terminals, the second processor of the common reception apparatus estimates a channel state of a radio link between the radio base station and the user terminal.

3. The radio communication system according to claim 1, wherein the second processor of the common reception apparatus performs Successive Interference Cancellation (SIC) on the signals transmitted from the plurality of user terminals to detect a signal for each user terminal.

4. The radio communication system according to claim 1, wherein the radio base station performs beam forming for the plurality of user terminals, and thereby performs spatial division multiplexing to transmit a signal.

5. A common reception apparatus used in radio communications between a plurality of user terminals that exist inside a moving object and a radio base station, comprising:
 a receiver that receives signals transmitted from the radio base station via the plurality of user terminals;
 a processor that detects, by using the signals received from the user terminals, a signal addressed to each user terminal; and
 a transmitter that transmits the detected signal to a corresponding user terminal,
 wherein the common reception apparatus is disposed inside the moving object,
 wherein a user terminal of the plurality of user terminals time-multiplexes an orthogonal coding sequence into the signal transmitted from the radio base station to transmit to the common reception apparatus,
 wherein the processor estimates a channel state of a first radio link,
 wherein the processor estimates a channel state of a second radio link between the user terminal and the common reception apparatus, based on the orthogonal coding sequence included in the signal transmitted from the user terminal,
 wherein the processor detects a signal for a predetermined user terminal selected, as a common reception target to perform common reception processing, from among the plurality of user terminals that exist inside the moving object, and
 wherein the common reception target is selected from the plurality of user terminals such that a smaller value between reception quality of a radio link between the radio base station and the predetermined user terminal and reception quality of a radio link between the predetermined user terminal and the common reception apparatus is a predetermined value or more.

6. The common reception apparatus according to claim 5, wherein the processor estimates a channel state of a radio link between a user terminal of the plurality of user terminals and the common reception apparatus, based on an orthogonal coding sequence included in a signal transmitted from the user terminal, and
 wherein the orthogonal coding sequence is time-multiplexed into a signal transmitted from the radio base station by the user terminal, and is transmitted from the user terminal to the common reception apparatus.

7. A user terminal that exists inside a moving object and that communicates with a radio base station, comprising:
 a receiver that receives a signal from the radio base station; and
 a transmitter that transmits to a common reception apparatus disposed inside the moving object, the signal transmitted from the radio base station, wherein
 the signal transmitted by the transmitter is received by the common reception apparatus,
 a signal addressed to the user terminal is detected from the signal received by the common reception apparatus and is transmitted from the common reception apparatus to the user terminal,
 the receiver receives the signal addressed to the user terminal that is transmitted from the common reception apparatus, and
 the user terminal further comprises a processor that demodulates the signal addressed to the user terminal that is transmitted from the common reception apparatus,
 wherein processor time-multiplexes an orthogonal coding sequence into the signal transmitted from the radio base station to transmit to the common reception apparatus,
 wherein the common reception apparatus estimates a channel state of a first radio link,
 wherein the common reception apparatus estimates a channel state of a second radio link between the user terminal and the common reception apparatus, based on the orthogonal coding sequence included in the signal transmitted from the user terminal,
 wherein the common reception apparatus detects a signal for a predetermined user terminal selected, as a common reception target to perform common reception processing, from among a plurality of user terminals that exist inside the moving object, and
 wherein the common reception target is selected from the plurality of user terminals such that a smaller value between reception quality of a radio link between the radio base station and the predetermined user terminal and reception quality of a radio link between the predetermined user terminal and the common reception apparatus is a predetermined value or more.

* * * * *